United States Patent
Wu et al.

(10) Patent No.: US 9,704,189 B2
(45) Date of Patent: Jul. 11, 2017

(54) SYSTEM AND METHOD FOR A GRAPHICAL USER INTERFACE HAVING RECOMMENDATIONS

(71) Applicant: Rakuten Kobo, Inc., Toronto (CA)

(72) Inventors: James Wu, Toronto (CA); Robin Bennett, Toronto (CA); Jeffrey Ng Thow Hing, Toronto (CA); Jason Gamblen, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 148 days.

(21) Appl. No.: 13/931,563

(22) Filed: Jun. 28, 2013

(65) Prior Publication Data
US 2014/0068471 A1 Mar. 6, 2014

Related U.S. Application Data

(60) Provisional application No. 61/697,077, filed on Sep. 5, 2012.

(51) Int. Cl.
| G06F 3/048 | (2013.01) |
| G06Q 30/06 | (2012.01) |
| G06T 11/60 | (2006.01) |
| G06F 17/21 | (2006.01) |
| G06F 3/0481 | (2013.01) |
| G06F 3/0485 | (2013.01) |

(Continued)

(52) U.S. Cl.
CPC ....... *G06Q 30/0631* (2013.01); *G06F 3/0485* (2013.01); *G06F 3/04812* (2013.01); *G06F 17/212* (2013.01); *G06Q 10/10* (2013.01); *G06Q 50/01* (2013.01); *G06T 11/60* (2013.01)

(58) Field of Classification Search
CPC .................... G06F 17/30867; G06Q 30/0255
See application file for complete search history.

(56) References Cited

U.S. PATENT DOCUMENTS

| 6,693,652 B1 * | 2/2004 | Barrus ................. G06F 3/0481 |
| | | 707/E17.009 |
| 2002/0000998 A1 * | 1/2002 | Scott ................. G06F 17/30274 |
| | | 345/667 |

(Continued)

*Primary Examiner* — William Bashore
*Assistant Examiner* — Rayeez Chowdhury
(74) *Attorney, Agent, or Firm* — Oblon, McClelland, Maier & Neustadt, L.L.P.

(57) ABSTRACT

A system and method for a graphical user interface having recommendations. The method includes accessing, within a mobile device, a data store corresponding to a multimedia container. The multimedia container comprises a first object and a second object and the data store comprises metadata associated with the first object and the second object. The method further includes sending the metadata associated with the first object and the second object and receiving a data structure corresponding to a plurality of items. The data structure comprises a respective image and a respective location for each of the plurality of items. The plurality of items is related to the first object and the second object based on the metadata associated with the first object and the second object. The method further includes displaying, on the mobile device, each respective image for each of the plurality of items. Each respective image is operable to be selected.

22 Claims, 8 Drawing Sheets

(51) Int. Cl.
  *G06Q 10/10* (2012.01)
  *G06Q 50/00* (2012.01)

(56) References Cited

U.S. PATENT DOCUMENTS

| | | | |
|---|---|---|---|
| 2003/0226144 A1* | 12/2003 | Thurston | H04N 7/165 725/39 |
| 2007/0097975 A1* | 5/2007 | Rakers | G06Q 30/0241 370/392 |
| 2008/0195981 A1* | 8/2008 | Pulier | G11B 27/034 715/719 |
| 2008/0243788 A1* | 10/2008 | Reztlaff | G06F 17/30657 |
| 2009/0070673 A1* | 3/2009 | Barkan | H04N 5/44513 715/716 |
| 2009/0070695 A1* | 3/2009 | Oh | G06F 3/04886 715/769 |
| 2009/0099931 A1* | 4/2009 | Aaltonen | G06Q 30/0257 705/14.55 |
| 2011/0179453 A1* | 7/2011 | Poniatowski | G06F 3/0482 725/58 |
| 2012/0084292 A1* | 4/2012 | Liang | G06F 17/30899 707/741 |
| 2013/0054371 A1* | 2/2013 | Mason | G06Q 30/02 705/14.64 |
| 2013/0124310 A1* | 5/2013 | Barbieri | G06Q 30/0631 705/14.49 |

\* cited by examiner

SYSTEM AND METHOD FOR A GRAPHICAL USER INTERFACE HAVING RECOMMENDATIONS

CROSS REFERENCE TO RELATED APPLICATIONS

This application claims the benefit of and priority to the provisional patent application, Ser. No. 61/697,077, entitled "SYSTEM AND METHOD OF PROVIDING A USER INTERFACE ON A MOBILE DEVICE," with filing date Sep. 5, 2012, and hereby incorporated by reference in its entirety.

This application is related to non-provisional patent application Ser. No. 13/901,363, entitled "SYSTEM AND METHOD FOR A MULTIMEDIA CONTAINER," with filing date of May 23, 2013, and hereby incorporated by reference in its entirety.

This application is related to non-provisional patent application, Ser. No. 13/901,429, entitled "SYSTEM AND METHOD FOR MANAGING OBJECTS IN A MULTIMEDIA CONTAINER," with filing date of May 23, 2013, issued as U.S. Pat. No. 9,524,078 on Dec. 20, 2016, and hereby incorporated by reference in its entirety.

This application is related to non-provisional patent application Ser. No. 13/901,465, entitled "SYSTEM AND METHOD FOR DISPLAYING A MULTIMEDIA CONTAINER," with filing date of May 23, 2013, issued as U.S. Pat. No. 9,342,324 on May 17, 2016, and hereby incorporated by reference in its entirety.

This application is related to non-provisional patent application, Ser. No. 13/901,498, entitled "SYSTEM AND METHOD FOR A HOME MULTIMEDIA CONTAINER," with filing date of May 23, 2013, issued as U.S. Pat. No. 9,535,569 on Jan. 3, 2017, and hereby incorporated by reference in its entirety.

This application is related to non-provisional patent application, Ser. No. 13/948,941, entitled "SYSTEM AND METHOD FOR A GRAPHICAL USER INTERFACE INCLUDING A READING MULTIMEDIA CONTAINER," with filing date of Jul. 23, 2013, issued as U.S. Pat. No. 9,501,792 on Nov. 22, 2016, and hereby incorporated by reference in its entirety.

FIELD OF THE INVENTION

Embodiments of the present invention are generally related to graphical user interfaces that may be part of a mobile device operating system.

BACKGROUND

As computing technology has advanced, computers have become smaller and more portable thereby bringing about powerful handheld devices capable of performing functions of more traditional computing technology. These advancements have resulting in rapid growth and sales of mobile devices. The portable nature and corresponding smaller size of mobile devices means that conventional merchandising and advertising is not well suited for mobile devices.

A user browsing the Internet may be able to quickly identify content that looks and feels like advertisements and often ignores the perceived advertising content accordingly. For example, banner ads may be tall and thin while other advertisements are short and wide. The smaller screen of a mobile device may result in a user being increasingly more critical of content that may be an advertisement and accordingly ignores the content perceived to be an advertisement. In particular, content that regularly directs a user to pay content is likely to be avoided or ignored by a user. Thus, conventional advertisements are not well suited for a mobile device.

SUMMARY OF THE INVENTION

Accordingly, what is needed is a solution to allow content to be presented to a user in an area that receives the user's attention and is relevant to the user. Embodiments of the present invention provide contextual recommendations with a mixture of free and pay content. Embodiments of the present invention thus provide a recommendations area that includes an adjustable mix of paid and free content t thereby allowing users to find free content that is interesting and relevant to the user. The recommendations are contextually based on content, applications, and widgets that the user has expressed interest in (e.g., by adding to a multimedia container). A user is further able to explore the recommendations without incurring any cost. For example, a user may view details about recommended free and pay content before proceeding.

In one embodiment, the present invention is directed to a method for displaying a graphical user interface. The method includes accessing, within a mobile device, a data store corresponding to a multimedia container. The multimedia container comprises a first object and a second object and the data store comprises metadata associated with the first object and the second object. The method further includes sending the metadata associated with the first object and the second object and receiving a data structure corresponding to a plurality of items. The method may further include determining the plurality of items based on the metadata associated with the first object and the second object. The data structure comprises a respective image and a respective location for each of the plurality of items. In one embodiment, each respective location comprises a uniform resource locator (URL) and the data structure further comprises a respective description and a respective title for each of the plurality of items. In one embodiment, the data structure comprises an ordered list of the plurality of items. The ordered list may be based on a respective priority of each of the plurality of items. The data structure is operable to comprise a rating corresponding to an item of the plurality of items. In one exemplary embodiment, the data structure is operable to comprise a location corresponding to a preview of a piece of content. The plurality of items is related to the first object and the second object based on the metadata associated with the first object and the second object. The method further includes displaying, on the mobile device, each respective image for each of the plurality of items. Each respective image is operable to be selected.

In one embodiment, the present invention is directed toward a computer-readable storage medium having stored thereon, computer executable instructions that, if executed by a computer system cause the computer system to perform a method for displaying a graphical user interface. The method includes receiving, from a mobile device, metadata associated with a first piece of content and determining a second piece of content related to the first piece of content based on the metadata associated with the first piece of content. In one embodiment, the first piece of content is associated with a multimedia container (e.g., the first piece of content is within the multimedia container). The first piece of content may be selected from the group consisting of an image, a book, an audio file, a video, and a website. In one embodiment, the determining of the second piece of content is based on analysis of text of the first piece of content.

The method further includes sending data corresponding to the second piece of content. The data comprises a first location of an image corresponding to the second piece of content and a second location corresponding to second piece of content. The second location may comprise a uniform resource locator (URL). The data may further comprise a rating (e.g., average customer rating). The method may further include receiving an indication that a user is not interested in the second piece of content, determining a third piece of content related to the first piece of content based on the first piece of content and the second piece of content, and sending data corresponding to the third piece of content. The method may further include receiving metadata associated with the second piece of content, determining a third piece of content related to the first piece of content and related to the second piece of content, and sending data corresponding to the third piece of content.

In another embodiment, the present invention is implemented as a system for displaying a graphical user interface. The system includes a data store access module operable to access a data store corresponding to a first plurality of pieces of content and a communication module operable to send metadata associated with the plurality of pieces of content and further operable to receive data associated with a second plurality of pieces of content. The data associated with the second plurality of pieces of content comprises a respective image corresponding to each of the second plurality of pieces of content. The second plurality of pieces of content is recommended based on the metadata associated with the first plurality of pieces of content. In one embodiment, the communication module is further operable to receive an indication that a user is not interested in one of the second plurality of pieces of content.

The system further includes a display module operable to display each respective image corresponding to the second plurality of pieces of content and a selection module operable to receive a selection of each respective image of the second plurality of pieces of content. The system may further include a recommendation module operable to determine the second plurality of pieces of content based on the metadata associated with the first plurality of pieces of content. The system may further include an image determination module operable to determine a respective image corresponding to each of the second plurality of pieces of content. In one embodiment, the recommendation module is operable to determine the second plurality of pieces of content based on metadata associated with the first plurality of pieces of content and an indication that a user is not interested in one of the second plurality of pieces of content.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
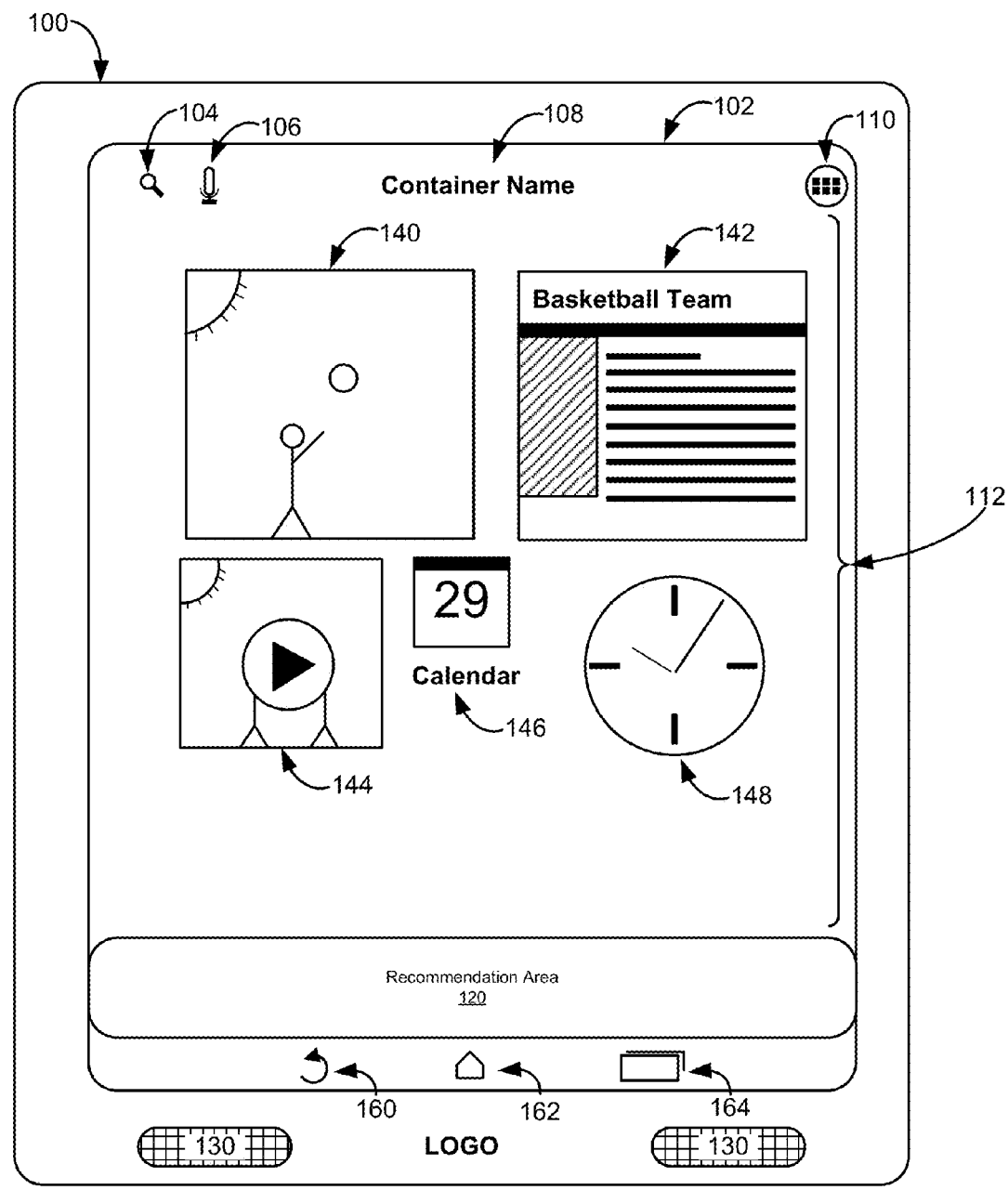
FIG. 1 shows an exemplary mobile device and an exemplary graphical user interface in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 800 of FIG. 8), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Systems and Methods for a Graphical User Interface Having Recommendations Embodiments of the present invention provide contextual recommendations with a mixture of free and pay content. Embodiments of the present invention thus provide a recommendations area that includes an adjustable mix of paid and free content thereby allowing users to find free content that is interesting and relevant to the user. The recommendations are contextually based on content, applications, and widgets that the user has expressed interest in (e.g., by adding to a multimedia container). A user is further able to explore the recommendations without incurring any cost. For example, a user may view details about recommended free and pay content before proceeding.

Embodiments of the present invention provide recommended pieces of content (e.g., free and pay content) that are contextual to a user's focus of interest. The focus may be determined from the content of a multimedia container (e.g., with multiple pieces of content). For example, if a user had added pieces of content about cars including websites about different car manufactures, various online car forums, and car books, a focus on cars is determined and recommended items related to cars are presented to the user. The recommendations may include websites, videos, music, and books that the user may not have been aware of Embodiments thereby allow a user to be comfortable looking at recommendations area because he or she knows that there is free content that is interesting and relevant to the user. The recommendations area makes it easy to find interesting and unexpected new things without spending a lot of time searching or feeling like he or she is shopping and at risk of having to incur cost.

FIGS. 1-5 illustrate example components used by various embodiments of the present invention. Although specific components are disclosed in FIGS. 1-5, it should be appreciated that such components are exemplary. That is, embodiments of the present invention are well suited to having various other components or variations of the components recited in FIGS. 1-5. It is appreciated that the components in FIGS. 1-5 may operate with other components than those presented, and that not all of the components of FIGS. 1-5 may be required to achieve the goals of embodiments of the present invention.

FIG. 1 shows an exemplary mobile device and an exemplary multimedia container of an exemplary graphical user interface in accordance with one embodiment of the present invention. FIG. 1 depicts an exemplary graphical user interface comprising an exemplary multimedia container displayed by a device (e.g., tablet computing device, mobile phone, smartphone, or the like) and a recommendations area.

In one embodiment, device 100 is a mobile computing device. Device 100 comprises speakers 130 and screen 102. In one embodiment, screen 102 is a touch sensitive (e.g., capacitive touch screen) operable to receive input (e.g., from a user via one or more fingers) and display a graphical user interface. Speakers 130 are operable for output of audio during rendering of content (e.g., video, video games, animations, system functions, etc.).

Device 100 is operable to render a graphical user interface comprising a multimedia container. A multimedia container is a graphically navigable container that is operable to hold various objects of various media types, applications, and widgets. A multimedia container may include other multimedia containers therein which may include content, applications, widgets, etc. Multimedia containers display content in a pictorial manner thereby surfacing content for immediate consumption.

FIG. 1 depicts an exemplary graphical user interface rendered by device 100. The exemplary graphical user interface comprises search icon 104, voice recognition icon 106, container name 108, applications icon 110, object area 112, recommendation area 120, and controls icon 160-164. It is noted the objects within the multimedia container described below are exemplary and embodiments of the present invention can support more or less objects.

Object area 112 comprises pieces of content, application icons, and widgets of a multimedia container. In one exemplary embodiment, object area 112 includes image 140, website image 142, video image 144, application icon 146, and widget 148. Pieces of content may be shown in pictorial form (e.g., without filenames). Objects in object area 112 to be resized by a user. Objects within object area 112 are selectable to launch a corresponding application or corresponding application for rendering content corresponding to the object in object area 112. Objects within object area 112 may be moved around (e.g., via dragging after selection via pressing and holding) or resized (e.g., via pressing and holding and manipulating a size control).

Image 140 is an image (e.g., scaled image, thumbnail, or the like) corresponding to an image that is stored on device 100. In one exemplary embodiment, image 140 is a scaled version of a child playing basketball (e.g., with a filename). Image 140 is selectable (e.g., via a touch or press) and is operable to launch an image viewing application to display an image corresponding to image 140 at full resolution. For example, a user can view image 140 at one resolution within the multimedia container and to see more detail a user can select image 140 to see the high resolution image that image 140 corresponds thereto.

Website image 142 corresponds to a rendering of a webpage (e.g., via a browser). In one exemplary embodiment, website image 142 is a scaled version of a rendering of the webpage according to a size specified corresponding to a multimedia container. In another embodiment, website image 142 is an image determined and selected from the content of the website corresponding to website image 142. Website image 142 is operable to be selected (e.g., via a touch or press) and is operable to launch a web browser to display the website corresponding to website image 142. Website image 142 and other objects within a multimedia container may be updated periodically (e.g., hourly, daily, and the like). In one embodiment, website image 142 and other objects are updated each time a user accesses the content corresponding to the object (e.g., the website corresponding to website image 142).

Video image 144 corresponds to a video (e.g., stored locally on device 100 or available over a communications network). In one embodiment, video image 144 is a scaled version (e.g., thumbnail) of a key frame of a video with an optional title. In one exemplary embodiment, video image 144 is a scaled version of a key frame of the video scaled according to a size specified corresponding to a multimedia container. Video image 144 is operable to be selected (e.g., via a touch or press) and is operable to launch a video application (e.g., for a video stored locally on device 100 or available for streaming) or launch a website with the video corresponding to video image 144.

Application icon 146 corresponds to an application and is selectable to launch the corresponding application. In one exemplary embodiment, application icon 146 corresponds to a calendar application and application icon 146 comprises an image of a calendar with the current date and text below with the name of the application.

Widget 148 is a widget and is operable to display live, auto-updating content. In one exemplary embodiment, widget 148 is a clock widget operable to display the current time. In one embodiment, widget 148 is operable to be selected (e.g., via touch or press) and upon selection launch a corresponding application (e.g., an clock application with alarm, timer, and stopwatch functionality).

Recommendation area 120 is operable to display recommendations of content (e.g., free or pay content) based on the objects of a multimedia container (e.g., based on the metadata associated with the objects of a multimedia container), as described herein. In one embodiment, recommendation area 120 includes images representing content that is recommended based on the pieces of content (and/or applications and widgets) in the multimedia container. In one exemplary embodiment, an exemplary implementation of a recommendation area is a discover bar or ribbon available from Kobo Inc. of Toronto, Canada.

Control icons 160-164 are operable for navigation of a plurality of multimedia containers and switching applications. Back control 160 is operable for navigation to a previous multimedia container. Home control 162 is operable for navigating to a home multimedia container. Recent apps button 164 is operable to invoke a function for changing applications.

Figure 2:
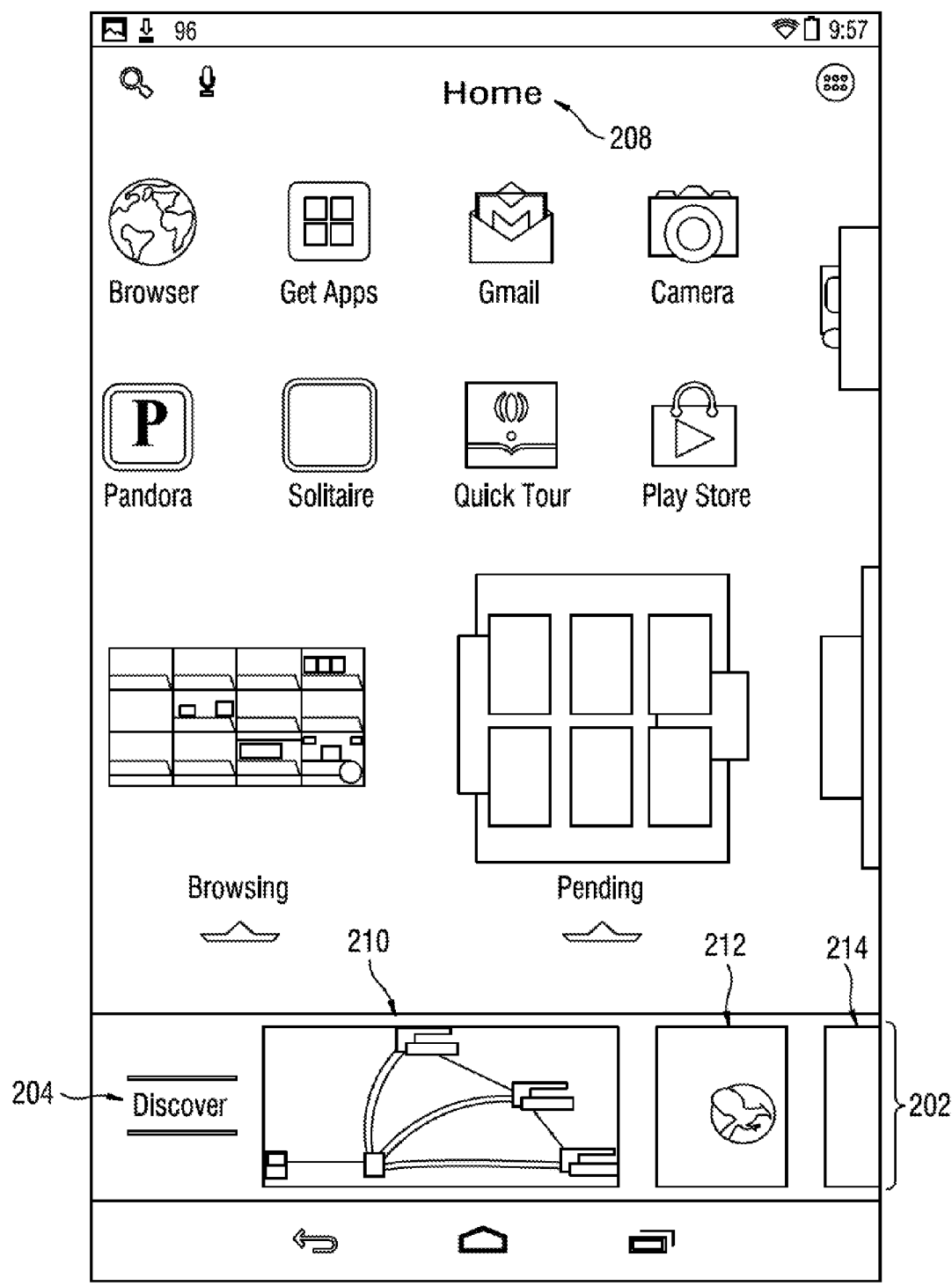
FIG. 2 shows an exemplary graphical user interface with an exemplary recommendation area in accordance with one embodiment of the present invention.

FIG. 2 shows an exemplary graphical user interface with an exemplary recommendation area in accordance with one embodiment of the present invention. Exemplary graphical user interface 200 includes exemplary recommendation area 202. In one embodiment, exemplary graphical user interface 200 includes elements similar to exemplary graphical user interface 100.

In one exemplary embodiment, exemplary graphical user interface 200 depicts a multimedia container with container name 208 of home. The home multimedia container may be a multimedia container presented to a user upon loading or booting of an operating system.

The recommendations in recommendation area 202 may be based on the pieces of content, applications, and widgets in the home multimedia container and the multimedia containers within the home multimedia container (e.g., browsing and reading multimedia containers as shown in FIG. 2). Recommendations area 202 may thus include recommended pieces of content based on the pieces of content within a multimedia container being displayed and the pieces of content within the multimedia containers that are within the multimedia container being displayed. For example, when a user is in a home multimedia container which includes a reading multimedia container and a car multimedia container, recommendations area 202 may include recommended items related to the books in the reading multimedia container and cars multimedia container.

When a multimedia container is opened or accessed, recommendations area 202 may present recommendations based on the contents of the opened multimedia container. For example, if a user opens a car multimedia container, recommendations area 202 may include car related items including websites about cars and car videos. As another example, if a user has a multimedia container for his or her favorite holiday spot, when the multimedia container is opened, recommendations area 202 may display books about the area and magazine articles about new restaurants.

Exemplary recommendation area 202 includes label 204 and images 210-214. Label 204 may include a name or title of recommendation area 202 (e.g., discover) to indicate to a user that that the area is for discovering new or related content. Images 210-214 are selectable images that correspond to pieces of content that are recommended to a user viewing a home multimedia container. In other words, the pieces of content that images 210-214 correspond to are pieces of content recommended based on the contents of the home multimedia container. In another embodiment, the recommendations are based on the files or applications in a folder. Recommendation area 202 may include a variety of recommended pieces of content including, but not limited to, audio files, songs, videos, movies, books (e.g., electronic books), magazines, images, websites, video websites, blogs, widgets, applications, etc. The recommended pieces of content represented by images 210-214 may be based on the places, people, ideas, themes, and genres in one or more multimedia containers.

Image 210 is an image of a website (e.g., thumbnail or rendered version of the website) and represents a recommended website (e.g., an icon representing the recommended website). Image 210 may be determined based on analyzing a website to determine an image most representative of the website. In one embodiment, the determination of the image may be based on the sizes of the images, the extensions of the images, and shapes of the images on the website. Images 212-214 are images of the book covers of recommended books in recommendation area 202. Images 210-214 may be selected by a user via touching or pressing on images 210-214.

The recommendations of recommendation area 202 may be based on a user's interaction with various pieces of content. For example, when a user adds a piece of content to a multimedia container, the recommendations of recommendation area 202 may be updated. As another example, how recently a user has accessed a piece of content may be used to determine the recommendations of recommendation area 202. In one embodiment, recommendations area 202 is automatically updated as the user interacts with various pieces of content. The recommendations may be based directly on pieces of content the user has already collected (e.g., added to a multimedia container). For example, a new book by an author that a user is following on Twitter™, from Twitter Corporation of San Francisco, Calif., may be recommended.

Recommendations area 202 may display a portion of the determined recommendations (e.g., a subset of the recommended pieces of content) and allow a user to scroll (e.g., left to right) through the recommendations to see the recommendations that are not initially displayed. In one embodiment, a user may scroll through the recommended items by swiping a finger across recommendations area 202.

In one embodiment, recommendations area 202 displays recommendations based on a specific multimedia container. In one exemplary embodiment, recommendations area 202 displays recommendations based on the current book that is being read that is in a reading multimedia container. For example, if a user has not added any items to any multimedia containers on a device and is currently reading a book, the book that the user is currently reading will be the focus of the recommendations presented in recommendations area 202.

Referring to FIGS. 3A-B and 4A-B, exemplary graphical user interfaces for viewing recommended pieces of content, applications, and widgets are shown.

Figure 3A:
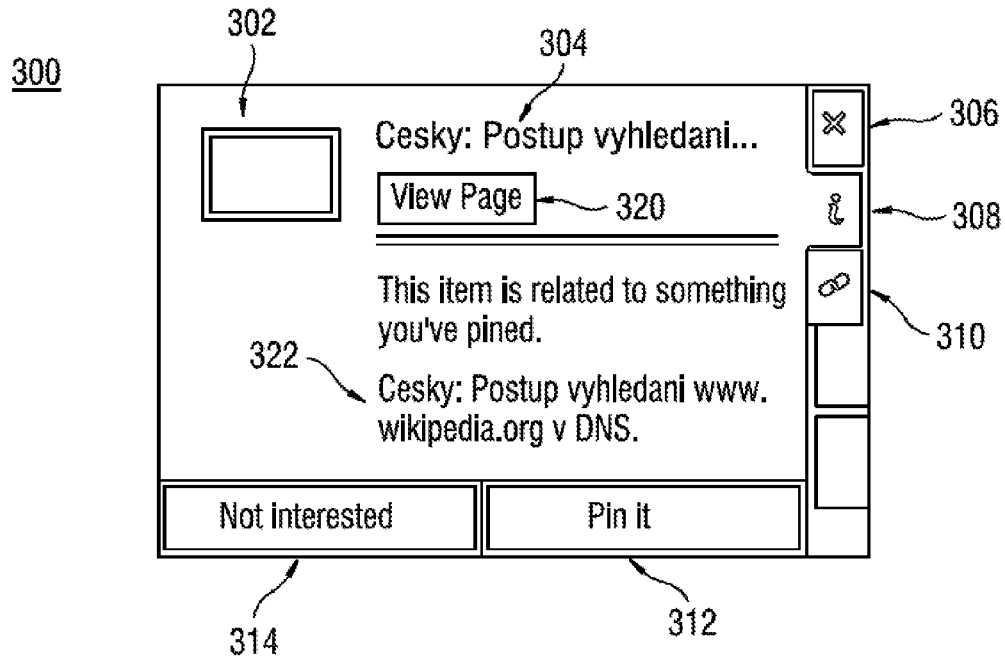
FIG. 3A shows an exemplary graphical user interface presented upon selection of an item from a recommendation area in accordance with one embodiment of the present invention.

FIG. 3A shows an exemplary graphical user interface presented upon selection of an item from a recommendation area in accordance with one embodiment of the present invention. FIG. 3A depicts a graphical user interface 300 displayed upon selection of a website in a recommendation area (e.g., recommendation area 120). Exemplary graphical user interface 300 may be presented in response to selection of a variety of types of content from recommendation area 120 including, but not limited to, audio files, songs, videos, movies, books (e.g., electronic books), magazines, images, websites, video websites, blogs, widgets, applications, etc. In one exemplary embodiment, exemplary graphical user interface 300 is displayed in response to selection of free recommended items. Exemplary graphical user interface 300 may provide a user information to assist the user in determining whether a recommended item is of interest to the user. Exemplary graphical user interface 300 includes image 302, label 304, close button 306, information tab button 308, related tab button 310, view page button 320, description 322, pin it button 312, and not interested button 314.

Information tab button 308 is operable for invoking display of an information tab including image 302, title 304, view page button 320, description 322, pin it button 312, and not interested button 314. In one exemplary embodiment, image 302 is an image of a website (e.g., thumbnail or rendered version of the website) and represents the recommended website. Label 304 includes a title of the website (e.g., from the <title> tag of the website). Close button 306 allows a user to close graphical user interface 300 and return to exemplary graphical user interfaces 200. Related tab button 310 is operable for invoking display of a related tab including item(s) of a multimedia container that are related to the recommended website (e.g., the website selected from recommendations area 202).

Pin it button 312 allows a user to pin or add the recommended website to a multimedia container. Pin it button 312 may allow a user to add the website to a multimedia container as described in to non-provisional patent application Ser. No. 13/901,429, entitled "SYSTEM AND METHOD FOR MANAGING OBJECTS IN A MULTIMEDIA CONTAINER," with filing date of May 23, 2013, issued as U.S. Pat. No. 9,524,078 on Dec. 20, 2016, and which is hereby incorporated by reference in its entirety. In one embodiment, a list of multimedia containers is presented after the user has selected pin it button 312. A user may also be presented with an option to create a new multimedia container and add the recommended website to the new multimedia container. For example, if a users sees a song in a recommendations area at lunchtime that the user would like to listen to in the evening, the user can add it to a multimedia container and find it when the user is ready to listen to the song.

In one embodiment, upon the adding of the recommended piece of content to a multimedia container, the recommended piece of content is removed from the recommended pieces of content in the recommendation area (e.g., recommendations area 202) and the recommendations are updated to reflect that the user was interested in the recommended piece of content. For example, if the user likes the previously recommended website, the recommendations area may be updated with other websites and pieces of content related to the previously recommended website.

Not interested button 314 allows a user to indicate that a recommended piece of content is not of interest to the user. In one embodiment, upon selection of not interested button 314, the recommended piece of content displayed in the information tab 308 is removed from the recommendations in the recommendation area (e.g., recommendations area 202) and the recommended pieces of content are updated based on the indication that a user is not interested in previously recommended website. Not interested button 314 may be used to train or tune a recommendations engine to not show similar items in the future.

View page button 320 allows a user to view or render the recommended website (e.g., by launching a web browser). Description 322 includes a description of the piece of content. For example, for the recommended website description 322 may include one or more paragraphs of the website (e.g., the first or more paragraphs), the website address, and/or a summary of the website.

Figure 3B:
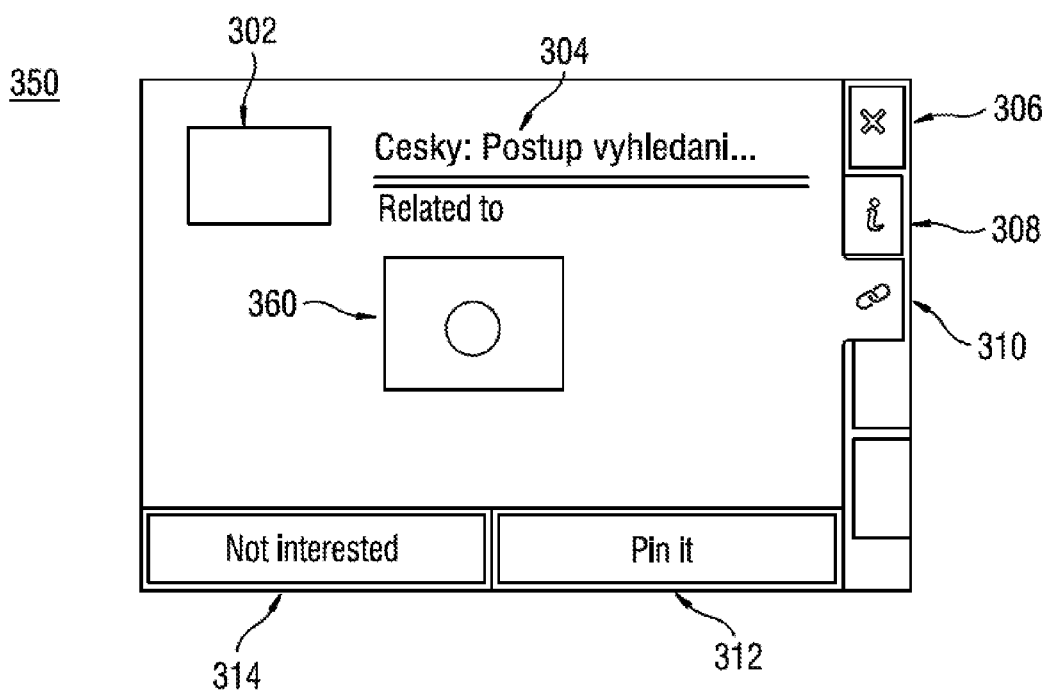
FIG. 3B shows an exemplary graphical user interface with an indication of a piece of content related to a recommended item presented within a recommendations area in accordance with one embodiment of the present invention.

FIG. 3B shows an exemplary graphical user interface with an indication of a piece of content related to a recommended item presented within a recommendations area in accordance with one embodiment of the present invention. Exemplary graphical user interface 350 includes related tab 310. Similar elements of graphical user interface 300 have substantially similar functions in graphical user interface 350. Related tab 310 includes image 302, label 304, pin it button 312, not interested button 314, and related area 360. Related area 360 an image corresponding to a piece of content or application of a multimedia container that is related to the recommended item (e.g., website). For example, the related area may show a website, movie, or book that was used to determine the recommended item. Related area 360 may show more a respective image for each piece of content, application, or widget in one of the multimedia containers on the device that are related to the recommended item.

Figure 4A:
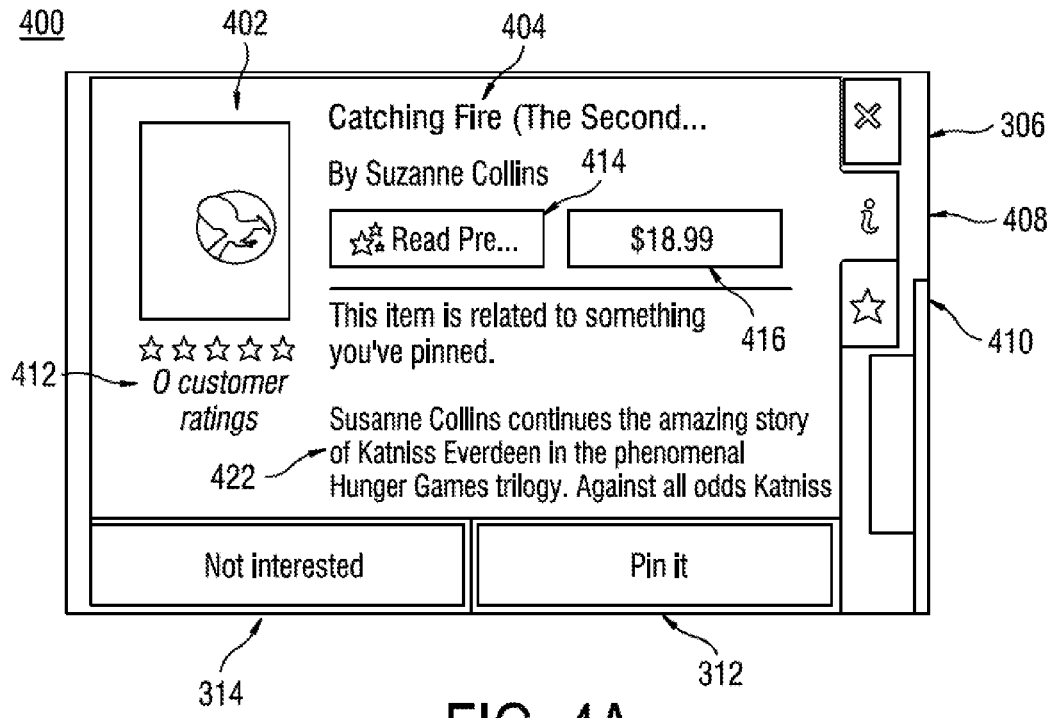
FIG. 4A shows an exemplary graphical user interface presented upon selection of a book from a recommendations area in accordance with one embodiment of the present invention.

FIG. 4A shows an exemplary graphical user interface presented upon selection of a book from a recommendations area in accordance with one embodiment of the present invention. Similar elements of graphical user interface 300 have may substantially similar functions in graphical user interface 400. In one embodiment, exemplary graphical user interface 400 is displayed upon selection of a recommended piece of pay content. Exemplary graphical user interface 400 allows a user to choose close button 306, information tab 408, and rating tab 410. FIG. 4A depicts a selected information tab 308 (e.g., displayed upon selection of a book from recommendations bar 120). In one embodiment, exemplary graphical user interface 400 includes a related tab (not shown) (e.g., substantially similar to related tab 310) operable to indicate which pieces of content or applications of one or more multimedia containers that are related to the recommended item (e.g., book).

Information tab 408 includes image 402, label 404, rating area 412, preview button 414, purchase button 416, and description area 422, pin it button 312, and not interested button 314. Image 402 is an image of the book (e.g., book cover). Label area 404 includes the title of the book and the author. Rating area 412 includes a rating based on other user's ratings (e.g., customer submitted ratings). Description area 422 includes a description of the book.

Preview button 414 allows a user to invoke a download and/or view a preview of the recommended book. Purchase button 416 allows a user to invoke a function to purchase the recommended book (e.g., launch an electronic bookstore). Upon purchase of a piece of content (e.g., book or music), the recommendations of a recommendation area may be updated accordingly. For example, the recommended book may be removed and new recommendations determined based on the user's purchase of the recommended book. Pin it button 312 allows a user to pin or add the book to a multimedia container. Not interested button 314 allows a user to indicate that the user is not interested in the recommended book and the recommendations may be updated accordingly.

Figure 4B:
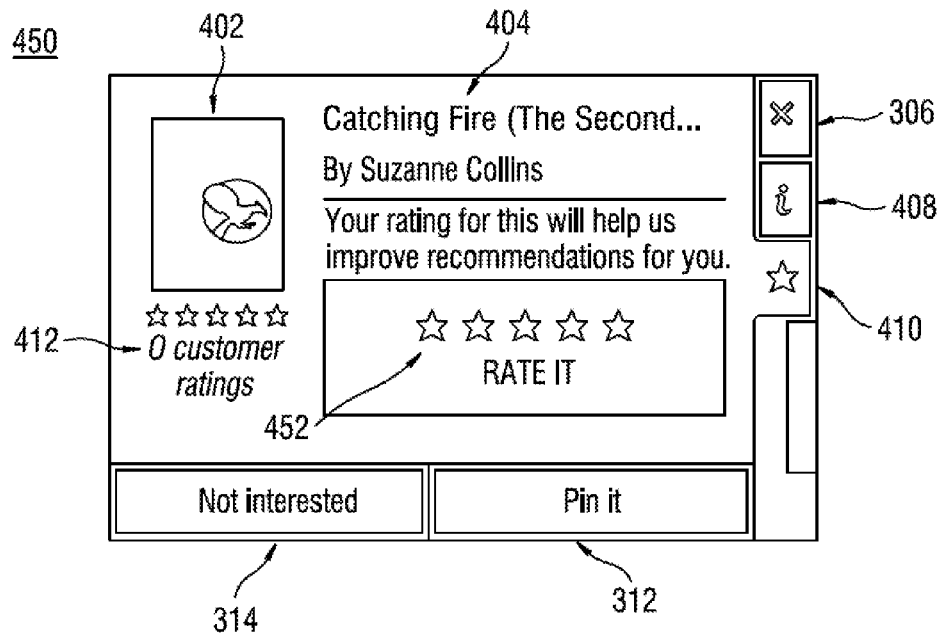
FIG. 4B shows an exemplary graphical user interface with a ratings area related to a book recommended within a recommendations area in accordance with one embodiment of the present invention.

FIG. 4B shows an exemplary graphical user interface with a ratings area related to a book recommended within a recommendation area in accordance with one embodiment of the present invention. Similar elements of graphical user interface 400 may have substantially similar functions in graphical user interface 450. FIG. 4B depicts a selected rating tab 410 (e.g., selected by a user via rating tab 410). Rating tab 410 includes image 402, label area 404, pin it button 312, not interested button 314, rating area 412, and user rating area 452. User rating area 452 is operable for a user to enter the user's rating of the recommended book or piece of content (e.g., song, etc.). A higher rating may result in similar books being recommended in a recommendation area (e.g., recommendation area 102). A lower rating (e.g., one or two stars) may result in fewer similar books being recommended in a recommendation area (e.g., recommendation area 102).

Figure 5:
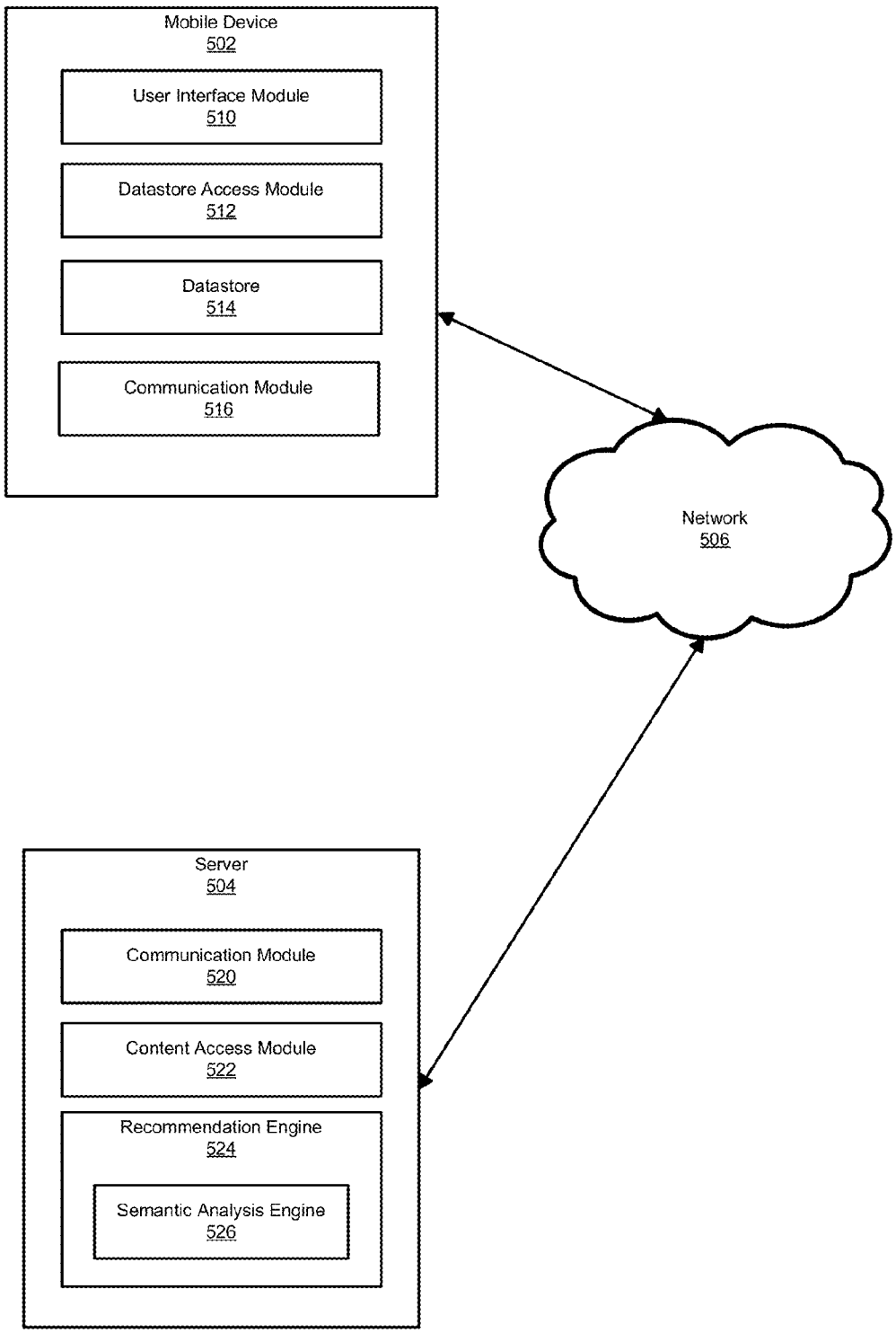
FIG. 5 shows a block diagram of an exemplary communication flow related to a recommendations area in accordance with one embodiment of the present invention.

FIG. 5 shows an exemplary communication diagram related to a recommendation area in accordance with one embodiment of the present invention. FIG. 5 depicts a communication diagram for generation, display, and updating of recommendations. Communication diagram 500 includes mobile device 502, server 504, and network 506. FIG. 5 depicts the use of a network 506 such as the Internet for exchanging data, but the present disclosure is not limited to the Internet or any particular network-based environment.

In one embodiment, mobile device 502 is communicatively coupled to server 504 via network 506. Mobile device 502 includes user interface module 510, data store access module 512, data store 514, and communication module 516. User interface module 510 is operable for displaying generated recommendations, receiving a user selection of a recommended item, and invoking updated recommendations based on user interaction (e.g., a user indicating that he or she is not interested a recommended item or buying/adding a recommended item to a multimedia container).

Data store 514 may include a data structure corresponding to a multimedia container including a plurality of pieces of content and one or more applications (and/or widgets). The data structure corresponding to the multimedia container may further include metadata about each of the pieces of content and the one or more applications (and/or widgets).

For a book, the metadata may include the text of the book (e.g., the entire body of text of an electronic book). For a website, the metadata may include the text of the website. For a video website, the metadata may include the video description and the tags of the video. For a song, the metadata may include the album, band name, and genre. The metadata for a song may be accessed from a music service. For an application or widget, the metadata may include a description from an application marketplace or application store.

For an image, the metadata may include the text from a website that includes the image. In one embodiment, a uniform resource locator (URL) of the image and one level up may be accessed. For example, if the image is located at http://www.somewebsite.com/directory/image.jpg, the text of the website at http://www.somewebsite.com/directory/ may be accessed and stored at the metadata associated with the image.

User interface module 510 may use data store access module 512 to access metadata in data store 514 and then use communication module 516 to send the metadata to server 504 via network 506. Mobile device 502 may then receive data about plurality of recommended items from server 504 (e.g., in response to the metadata). The items may include pieces of content, applications, and widgets. In one embodiment, the data about the plurality of recommended items is an ordered list (e.g., ordered based on an assigned priority). User interface module 510 may then display the respective images of the plurality of recommended items based on the ordered list.

In one embodiment, if a user adds a recommended item to a multimedia container, the metadata associated with the item added to the multimedia container is sent to server 504 for providing updated recommendations. Server 504 may thus remove the previously recommended item from the recommendations. In one embodiment, server 504 maintains a record of the items that are added to each multimedia container on mobile device 502 for use in generating recommendations.

In another embodiment, if a user rates an item (e.g., book or song), the rating and metadata associated with the rated item may be sent to server 504. In response server 504, may then determine updated recommendations and send the recommendations to mobile device 502. In one embodiment, when a user rates a book, the rating is used to adjust the books that are recommended by server 504.

In one embodiment, upon a user indicating that he or she is not interested in a recommended item, the indication may be sent by mobile device 502 to server 504. Recommendation engine 524 can then reprioritize and/or eliminate the kind of recommendations that the user has indicated he or she is not interested in.

Server 504 includes communication module 520, content access module 522, and recommendation engine 524. Communication module 520 is operable for allowing server 504 to communicate with mobile device 502 via network 506. Content access module 522 is operable for accessing content based on recommendations (e.g., files, images, text, etc. of recommended item generated by recommendation engine 524). Recommendations engine 524 is operable to access metadata received from mobile device 502 and generate contextual recommendations which are sent to mobile device 502 via communication module 520 and network 506.

In one exemplary embodiment, recommendations engine 524 determines recommendations for a multimedia container (e.g., being displayed) based on the content in the multimedia container and the content of multimedia containers therein. For example, for a cars multimedia container having a car 'brand A' multimedia container and a car 'brand B' multimedia container, recommendations engine 524 will determine recommended items related to car 'brand A' and car 'brand B.' When a user is viewing the car 'brand A' multimedia container, recommendation engine 524 will determine recommended items related to car 'brand A.' Similarly, when a user is viewing the car 'brand B' multimedia container, recommendation engine 524 will determine recommended items related to car 'brand B.'

In one exemplary embodiment, recommendation engine 524 prioritizes the determined recommendations. For example, where a recommendations area extends from left to right, recommended items with higher priority are placed on the left (e.g., based on items on the left being looked at the most). Recommended items may be prioritized according to how recently and how often the piece(s) of content used to determine the recommended item were accessed. If two pieces of content in a multimedia container result in the same recommended item, the priority of the recommended item may be increased.

In one embodiment, recommendation engine 524 includes semantic analysis engine 516. Semantic analysis engine 516 may parse and extract various portions of content for use by recommendation engine 514 in generating recommendations. In one exemplary embodiment, semantic analysis engine 526 is operable to recognize people, places, things, and items of interest in a body of text (e.g., from a book or website).

The amount of free content and paid content that is recommended may be varied and configurable. In one embodiment, the relative mix of free content and paid content in the recommendations is adjusted based on conversion of recommendations to revenue (e.g., how frequently a user purchases a recommended item). In one exemplary embodiment, initial recommendations may favor more free content and as time passes favor increasingly more paid content.

In one embodiment, recommendations are generic when a multimedia container is created. For example, the recommendations might include general interest news sites, general interest websites, and top 50 books when a multimedia container being displayed is empty. As a user adds content to the multimedia container, recommendation engine 524 uses the metadata associated with the content added to the multimedia container to determine more focused and user specific recommendations.

Figure 6:
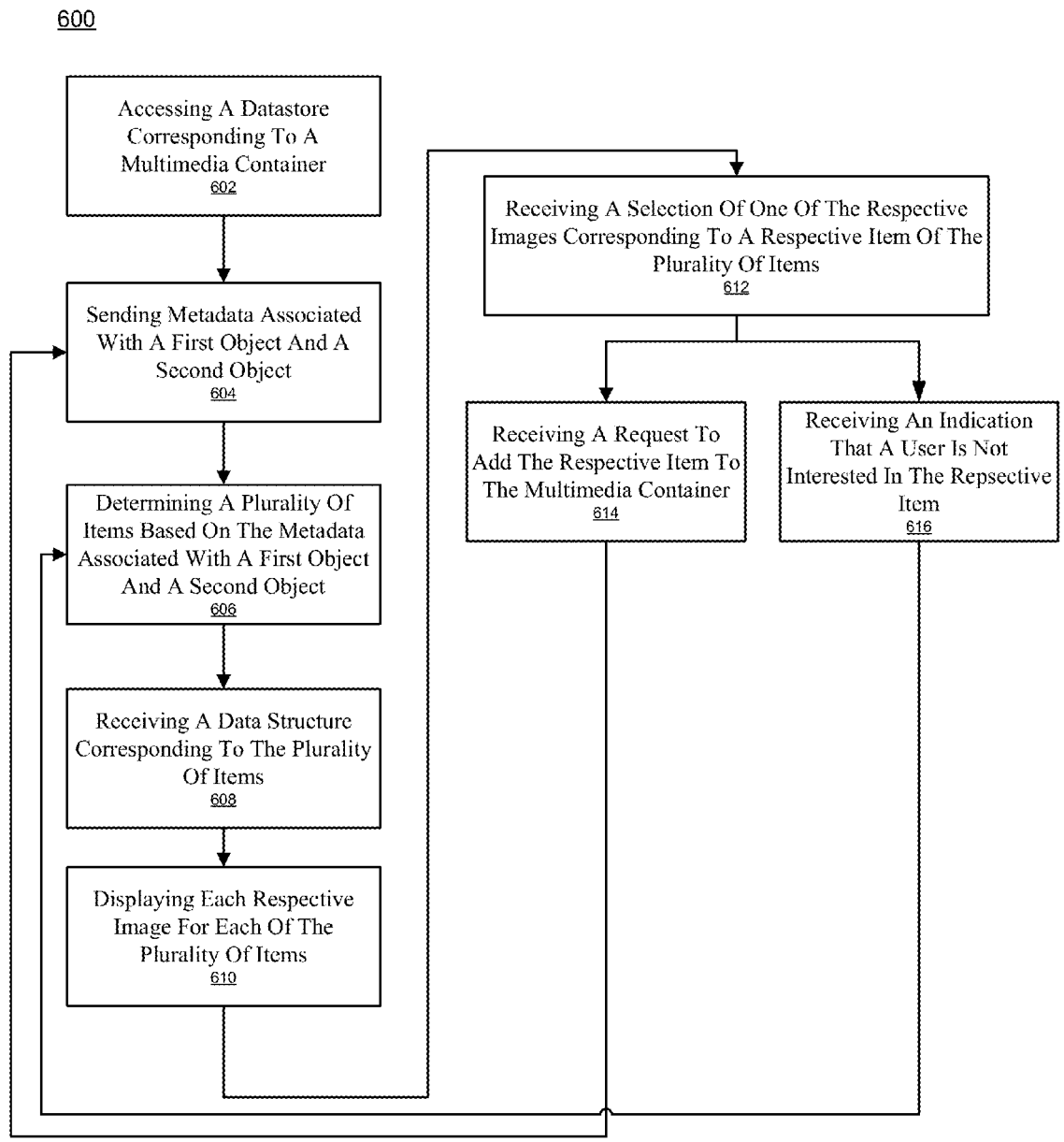
FIG. 6 shows a flowchart of an exemplary computer controlled process for generating a graphical user interface in accordance with one embodiment of the present invention.
Figure 7:
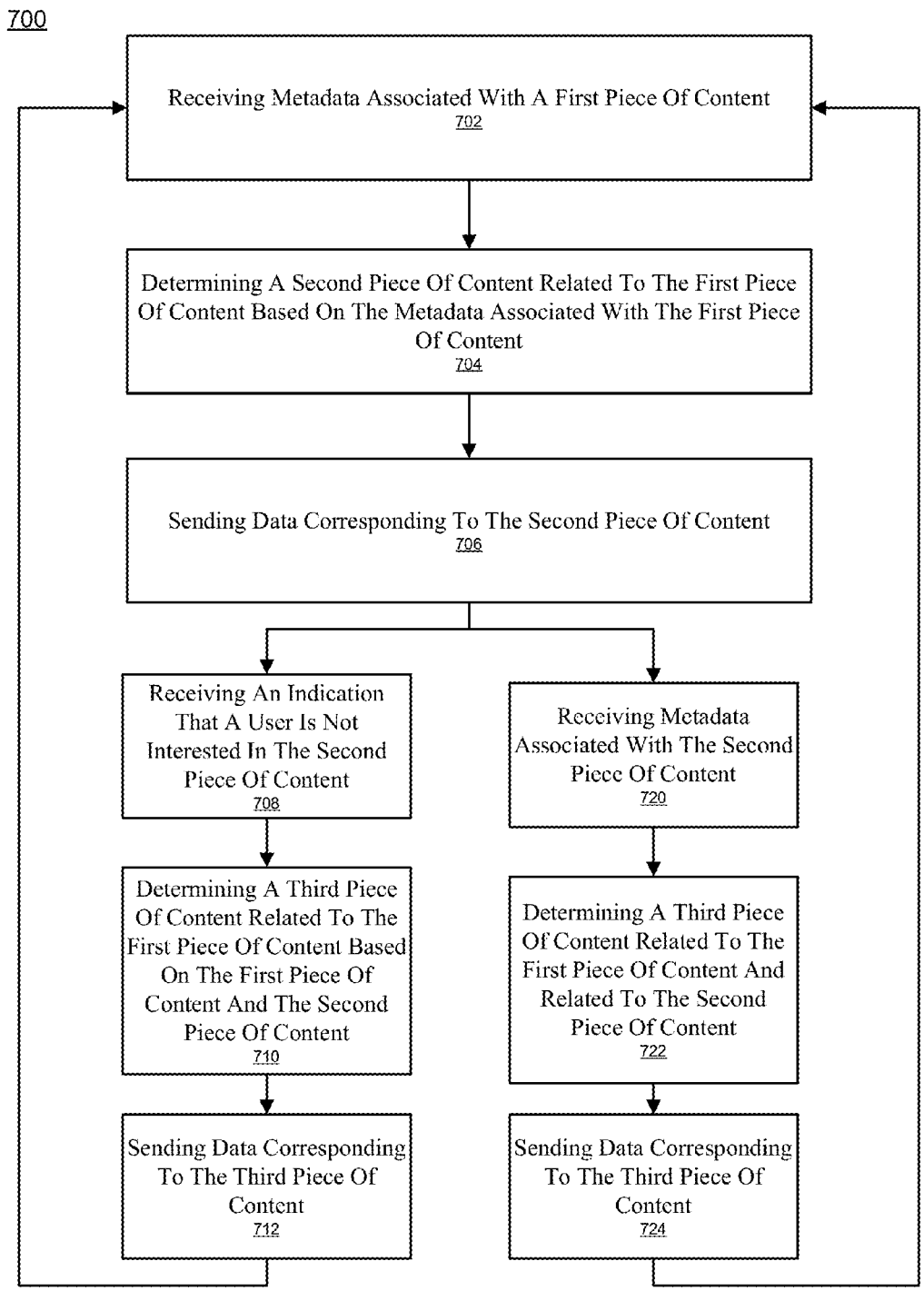
FIG. 7 shows a flowchart of an exemplary computer controlled process for determining recommendations in accordance with one embodiment of the present invention.

With reference to FIGS. 6-7, flowcharts 600-700 illustrate example functions used by various embodiments of the present invention for displaying graphical user interfaces, determining and updating recommended pieces of content, applications, and widgets. Although specific function blocks ("blocks") are disclosed in flowcharts 600-700, such steps are examples. That is, embodiments are well suited to performing various other blocks or variations of the blocks recited in flowcharts 600-700. It is appreciated that the blocks in flowcharts 600-700 may be performed in an order different than presented, and that not all of the blocks in flowcharts 600-700 may be performed.

FIG. 6 shows a flowchart of an exemplary computer controlled process for generating a graphical user interface in accordance with one embodiment of the present invention. In one exemplary embodiment, FIG. 6 depicts a process for generating and performing operations associated with a graphical user interface including a recommendation area (e.g., recommendations area 120).

At block 602, a data store corresponding to a multimedia container is accessed. The multimedia container may comprise a first object and a second object. The multimedia container may be operable to comprise one or more applications, widgets, and pieces of content. The data store may further comprise metadata associated with the first object and the second object.

At block 604, the metadata associated with a first object and a second object is sent. In one embodiment, the metadata is sent to a server (e.g., server 504) from the mobile device (e.g., mobile device 502).

At block 606, a plurality of items based on the metadata associated with the first object and the second object are determined. In one embodiment, the determining may be performed on a mobile device (e.g., mobile device 502). In another embodiment, the determining may be performed on a remote machine (e.g., server 504).

At block 608, a data structure corresponding to the plurality of items is received. The plurality of items may include recommended free or pay: content, applications, widgets, etc. The data structure may comprise a respective image, respective preview information (e.g., uniform resource locator (URL)), a respective price, respective purchase information (e.g., link to an electronic marketplace) and a respective location for each of the plurality of items. In one embodiment, each respective location comprises a URL and the data structure further comprises a respective description and a respective title for each of the plurality of items. In one embodiment, the plurality of items is related to the first object and the second object based on the metadata associated with the first object and the second object.

In one embodiment, the data structure comprises an ordered list of the plurality of items. In one exemplary embodiment, the ordered list is based on a respective priority of each of the plurality of items. The data structure may comprise a rating (e.g., submitted by customers of a piece of content) corresponding to an item of the plurality of items. In one embodiment, the data structure is operable to comprise a location corresponding to a preview of a piece of content.

At block 610, each respective image for each of the plurality of items is displayed. Each respective image may be displayed on the mobile device and be operable for selection. In one embodiment, a subset or portion of the images corresponding to the plurality of items is displayed and the remaining images are displayed upon scrolling of a recommendation area (e.g., recommendation area 202).

At block 612, a selection of one of the respective images corresponding to a respective item of the plurality of items is received. The section may be made by a user tapping or touching an image in a recommendation area and in response, a graphical user interface displaying information about the recommended item is displayed (e.g., exemplary graphical user interfaces 300-450).

At block 614, a request to add the respective item to the multimedia container is received. The request may be generated from a graphical user interface (e.g., pin it button 312 of exemplary graphical user interfaces 300-450).

At block 616, an indication that a user is not interested in the respective item is received. The indication may be generated from a graphical user interface (e.g., not interested button 314 of exemplary graphical user interfaces 300-450).

In one embodiment, a selection of another multimedia container may be received (e.g., based on a user selecting or requesting display of another multimedia container). Process 600 may then be performed for the newly selected multimedia container and new recommendations based on the newly selected multimedia container will be displayed. For example, another or new data structure will be received corresponding a new plurality of items (e.g., including recommendations based on the newly accessed multimedia container) and the new plurality of items will be displayed.

FIG. 7 shows a flowchart of an exemplary computer controlled process for determining recommendations in accordance with one embodiment of the present invention. FIG. 7 depicts a process of determining and updating recommendations for a recommendation area of a graphical user interface (e.g., recommendations area 120). Process 700 may be executed on a device (e.g., server 504) remote from a mobile device (e.g., mobile device 502).

At block 702, metadata associated with a first piece of content is received. The first piece of content may be a piece of content that is associated with a multimedia container. The metadata may be received from a mobile device (e.g., mobile device 100 or 502). The first piece of content may be selected from the group consisting of an image, a book, an audio file, a video, a website, magazine, application, and widget.

At block 704, a second piece of content related to and recommended based on the first piece of content is determined based on the metadata associated with the first piece of content. In one embodiment, the determining of the second piece of content is based on analysis of text of the first piece of content.

At block 706, data corresponding to the second piece of content is sent. The data may comprise a first location of an image corresponding to the second piece of content and a second location corresponding to second piece of content. In one embodiment, data comprises a rating (e.g., an average customer rating of a product). The second location may comprise a uniform resource locator (URL). The data may further a price, a preview link, a description, a title, author/artist, and purchase information (e.g., link to an electronic marketplace).

At block 708, an indication that a user is not interested in the second piece of content is received. The indication may be received after a user has selected a not interested button (e.g., of exemplary graphical user interfaces 300-450).

At block 710, a third piece of content related to the first piece of content is determined based on the first piece of content and the second piece of content. In one embodiment, the determining is based on the first piece of content and that the user is not interested in the second piece of content.

At block 712, data corresponding to the third piece of content is sent. The data corresponding to the third piece of content may include an image or link to an image, a location of the third piece of content, a price, a preview link, a description, a title, author/artist, and purchase information (e.g., link to an electronic marketplace).

At block 720, metadata associated with the second piece of content is received. In one embodiment, if a user adds the second piece of content to a multimedia container, the metadata associated with the second piece of content is sent (e.g., to server 504) for determining updated recommendations.

At block 722, a third piece of content related to the first piece of content and related to the second piece of content is determined. The third piece of content may be determined based on the previous recommendations and the user's expressed interested in the second piece of content (e.g., based on the user adding the second piece of content to the multimedia container).

At block 724, data corresponding to the third piece of content is sent. The data corresponding to the third piece of content may include an image or link to an image, a location of the third piece of content, a price, a preview link, a description, a title, author/artist, and purchase information (e.g., link to an electronic marketplace).

Figure 8:
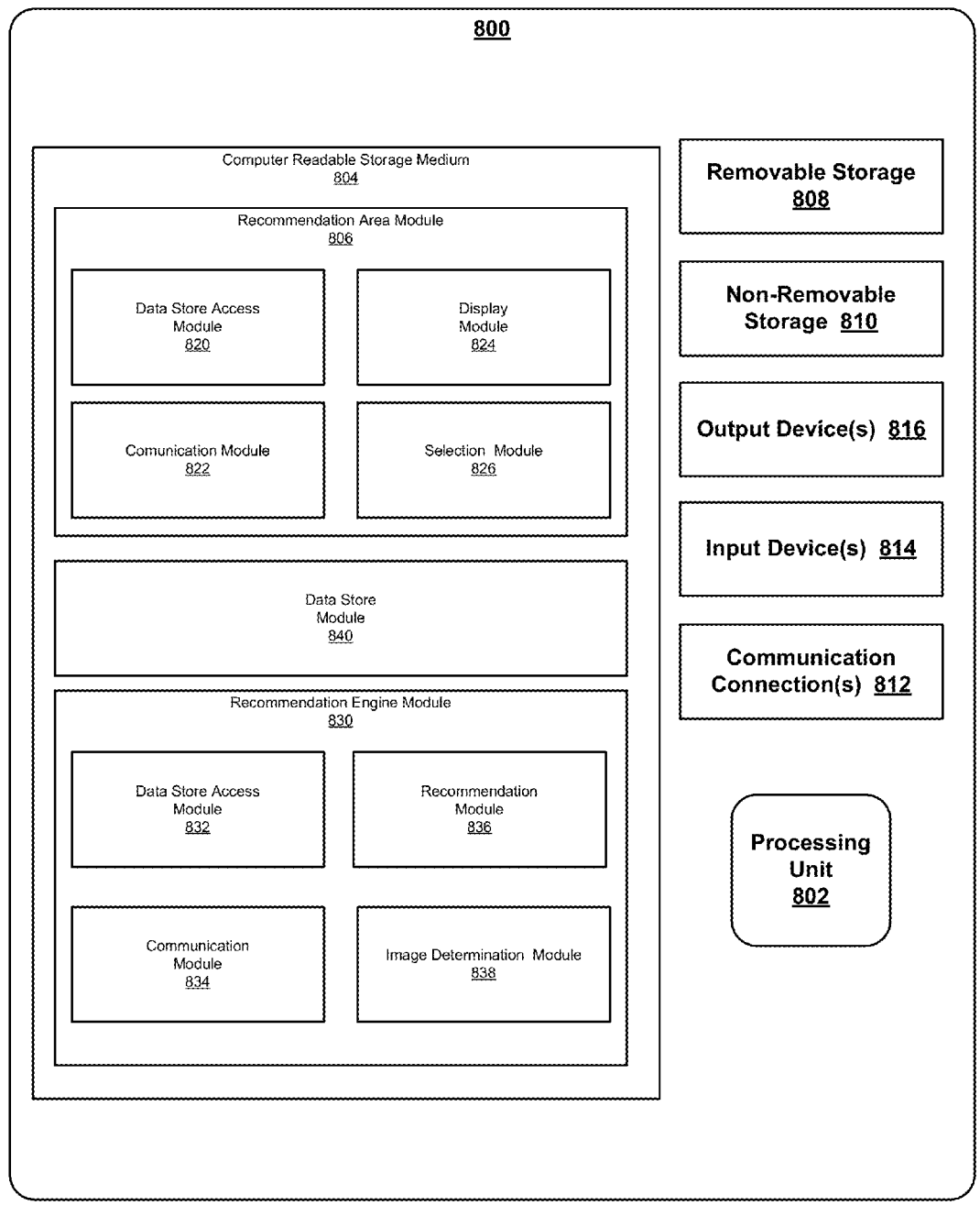
FIG. 8 shows a block diagram of exemplary computing system and corresponding modules, in accordance with one embodiment of the present invention.

FIG. 8 illustrates exemplary components used by various embodiments of the present invention. Although specific components are disclosed in computing system environment 800, it should be appreciated that such components are exemplary. That is, embodiments of the present invention are well suited to having various other components or variations of the components recited in computing system environment 800. It is appreciated that the components in computing system environment 800 may operate with other components than those presented, and that not all of the components of system 800 may be required to achieve the goals of computing system environment 800.

FIG. 8 shows a block diagram of exemplary computer system and corresponding modules, in accordance with one embodiment of the present invention. With reference to FIG. 8, an exemplary system module for implementing embodiments includes a general purpose computing system environment, such as computing system environment 800. Computing system environment 800 may include, but is not limited to, servers, desktop computers, laptops, tablet PCs, tablet computing devices, mobile devices, and smartphones. In its most basic configuration, computing system environment 800 typically includes at least one processing unit 802 and computer readable storage medium 804. Depending on the exact configuration and type of computing system environment, computer readable storage medium 804 may be volatile (such as RAM), non-volatile (such as ROM, flash memory, etc.) or some combination of the two. Portions of computer readable storage medium 804 when executed facilitate efficient execution of memory operations or requests for groups of threads. Computing system environment 800 may further include a power source (e.g., battery) (not shown) operable to allow computing system environment 800 to be movable and mobile while operating.

Additionally, computing system environment 800 may also have additional features/functionality. For example, computing system environment 800 may also include additional storage (removable and/or non-removable) including, but not limited to, magnetic or optical disks or tape. Such additional storage is illustrated in FIG. 10 by removable storage 808 and non-removable storage 810. Computer storage media includes volatile and nonvolatile, removable and non-removable media implemented in any method or technology for storage of information such as computer readable instructions, data structures, program modules or other data. Computer readable medium 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 800. Any such computer storage media may be part of computing system environment 800.

Computing system environment 800 may also contain communications connection(s) 812 that allow it to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 812 may allow computing system environment 800 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), Near Field Communication (NFC), Code Division Multiple Access (CDMA), Global System for Mobile Communications (GSM), Long-term Evolution (LTE), Worldwide Interoperability for Microwave Access (WiMax), wide area networks (WAN) such as the internet, serial, and universal serial bus (USB). It is appreciated the various network types that communication connection(s) 812 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 800 may also have input device(s) 814 such as a touch screen (e.g., capacitive touch screen), keyboard, mouse, pen, voice input device, touch input device, remote control, camera, etc. Output device(s) 816 such as a display (e.g., touch screen), speakers, etc. may also be included. All these devices are well known in the art and are not discussed at length.

In one embodiment, computer readable storage medium 804 includes recommendation area module 806, recommendation engine module 830, and data store 840. Recommendation area module 806 includes data store access module 820, communication module 822, display module 824, and selection module 826. Data store 840 is operable to store data (e.g., data structures) corresponding to objects (e.g., pieces of content, applications, and widgets) within one or more multimedia containers and metadata associated with the objects.

Data store access module 820 is operable to access a portion of data store 840 corresponding to a first plurality of pieces of content (e.g., in a multimedia container being displayed). The first plurality of pieces of content may be in a folder or a multimedia container, as described herein. Communication module 822 is operable to send metadata associated with the plurality of pieces of content and further operable to receive data associated with a second plurality of pieces of content. The data associated with the second plurality of pieces of content may include a respective image corresponding to each of the second plurality of pieces of content, as described herein. In one embodiment, the second plurality of pieces of content is recommended based on the metadata associated with the first plurality of pieces of content. In one embodiment, communication module 822 is further operable to receive an indication that a user is not interested in one of the second plurality of pieces of content, as described herein.

Display module 824 is operable to display each respective image corresponding to the second plurality of pieces of content. Selection module 826 is operable to receive a selection of each respective image of the second plurality of pieces of content. Selection module 826 may invoke exemplary graphical user interfaces 300 and 450 upon selection of a recommended piece of content.

Recommendation engine module 830 includes data store access module 832, communication module 834, recommendation module 836, and image determination module 838. Data store access module 832 is operable access received metadata associated with a multimedia container. The metadata may have been received via communication module 834 or accessed from data store 840. Communication module 834 is operable to receive metadata from recommendation area module 806 and operable to send recommendations or data associated with the second plurality of pieces of content (e.g., as an ordered list) to recommendation area module 806.

Recommendation module 836 is operable to determine the second plurality of pieces of content based on the metadata associated with the first plurality of pieces of content. In one embodiment, recommendation module 836 is operable to determine the second plurality of pieces of content based on metadata associated with the first plurality of pieces of content and an indication that a user is not interested in one of the second plurality of pieces of content.

Image determination module 838 is operable to determine a respective image corresponding to each of the second plurality of pieces of content. In one embodiment, image determination module 838 is operable to determine a book cover image for a book, a magazine cover for a magazine, an album cover image for a song, a website image for a website, an application icon for an application, a widget icon for a widget. Recommendation data as determined by recommendation module 836 and 838 may be sent to recommendation area module 806 for display to a user.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for displaying a graphical user interface, said method comprising:

accessing, within a mobile device, a data store corresponding to a multimedia container, wherein said multimedia container comprises a first object and a second object, wherein said multimedia container is a member of a hierarchy of multimedia containers stored in said mobile device, wherein said hierarchy comprises a home multimedia container at a root level of said hierarchy, wherein said data store comprises metadata associated with a first content of said first object and a second content of said second object, and wherein said multimedia container is operable to comprise one or more applications, widgets, and pieces of content;

sending said metadata associated with said first content of said first object and said second content of said second object;

determining a plurality of items for recommendation based on said metadata, wherein said plurality of items are different from and do not represent said first object and said second object, and wherein said plurality of items are related to at least a portion of said first content of said first object and at least a portion of said second content said second object;

receiving a data structure corresponding to the plurality of items, wherein said data structure comprises a respective image and a respective location for each of the plurality of items; and automatically displaying, on said mobile device, respective images for the plurality of items while simultaneously displaying at least said first object and said second object within said multimedia container, wherein each respective image is configured to initiate acquisition of a respective one of the plurality of items by a user upon selection of the respective image by the user.

2. The method as described in claim 1, wherein said plurality of items comprises a first piece of free content and a second piece of pay content.

3. The method as described in claim 1, wherein said data structure comprises a rating corresponding to an item of said plurality of items.

4. The method as described in claim 1, wherein an ordered list of said plurality of items is based on a respective priority of each of said plurality of items.

5. The method as described in claim 1, wherein each respective location comprises a uniform resource locator (URL) and wherein said data structure further comprises a respective description, and a respective title for each of the plurality of items.

6. The method as described in claim 1, further comprising:
receiving a selection of another multimedia container;
receiving another data structure corresponding to another plurality of items, wherein said another plurality of items comprises a plurality of recommended items based on said another multimedia container.

7. A non-transitory computer-readable storage medium having stored thereon, computer executable instructions that, if executed by a computer system, cause the computer system to:
access, within a mobile device, a data store corresponding to a multimedia container, wherein said multimedia container comprises a first object and a second object, wherein said multimedia container is a member of a hierarchy of multimedia containers stored in said mobile device, wherein said hierarchy comprises a home multimedia container at a root level of said hierarchy, wherein said data store comprises metadata associated with a first content of said first object and a second content of said second object, and wherein said multimedia container is operable to comprise one or more applications, widgets, and pieces of content;
send said metadata associated with said first content of said first object and said second content of said second object;
determine a plurality of items for recommendation based on said metadata, wherein said plurality of items are different from and do not represent said first object and said second object, and wherein said plurality of items are related to at least a portion of said first content of said first object and at least a portion of said second content said second object;
receive a data structure corresponding to the plurality of items, wherein said data structure comprises a respective image and a respective location for each of the plurality of items; and
automatically display, on said mobile device, respective images for the plurality of items while simultaneously displaying at least said first object and said second object within said multimedia container, wherein each respective image is configured to initiate acquisition of a respective one of the plurality of items by a user upon selection of the respective image by the user.

8. The non-transitory computer-readable storage medium as described in claim 7, wherein the computer executable instructions further cause the computer system to:
receive an indication that a user is not interested in a first item of said plurality of items;
determine a second item related to said first item for recommendation based on said first item, said first object, and said second object; and
display an image for the second item contemporaneously with displaying at least said first object and said second object of said multimedia container.

9. The non-transitory computer-readable storage medium as described in claim 8, wherein the computer executable instructions further cause the computer system to:
receive an indication that a user is interested in the second item;
determining a third item for recommendation related to said second item; and
display an image for the third item contemporaneously with displaying at least said first object and said second object of said multimedia container.

10. The non-transitory computer-readable storage medium as described in claim 7, wherein said plurality of items comprises a first piece of free content and a second piece of pay content.

11. The non-transitory computer-readable storage medium as described in claim 7, wherein said data structure comprises a rating corresponding to an item of said plurality of items.

12. The non-transitory computer-readable storage medium as described in claim 7, wherein each respective location comprises a uniform resource locator (URL) and wherein said data structure further comprises a respective description, and a respective title for each of the plurality of items.

13. The non-transitory computer-readable storage medium as described in claim 7, wherein at least one of said plurality of items is selected from a group consisting of an image, a book, an audio file, a video, and a web site.

14. The non-transitory computer-readable storage medium as described in claim 7, wherein said plurality of items are determined based on analysis of text of said first object and said second object.

15. A system for displaying a graphical user interface, said system comprising:
circuitry configured to:
access, within a mobile device, a data store corresponding to a multimedia container, wherein said multimedia container comprises a first object and a second object, wherein said multimedia container is a member of a hierarchy of multimedia containers stored in said mobile device, wherein said hierarchy comprises a home multimedia container at a root level of said hierarchy, wherein said data store comprises metadata associated with a first content of said first object and a second content of said second object, and wherein said multimedia container is operable to comprise one or more applications, widgets, and pieces of content;
send said metadata associated with said first content of said first object and said second content of said second object;
determine a plurality of items for recommendation based on said metadata, wherein said plurality of items are different from and do not represent said first object and said second object, and wherein said plurality of items are related to at least a portion of said first content of said first object and at least a portion of said second content said second object;

receive a data structure corresponding to the plurality of items, wherein said data structure comprises a respective image and a respective location for each of the plurality of items; and automatically display, on said mobile device, respective images for the plurality of items while simultaneously displaying at least said first object and said second object within said multimedia container, wherein each respective image is configured to initiate acquisition of a respective one of the plurality of items by a user upon selection of the respective image by the user.

16. The system as described in claim 15, wherein said plurality of items comprises a first piece of free content and a second piece of pay content.

17. The system as described in claim 15, wherein said data structure comprises a rating corresponding to an item of said plurality of items.

18. The system as described in claim 17, wherein an ordered list of said plurality of items is based on a respective priority of each of said plurality of items.

19. The system as described in claim 15, wherein each respective location comprises a uniform resource locator (URL) and wherein said data structure further comprises a respective description, and a respective title for each of the plurality of items.

20. The method as described in claim 6, further comprising:

receiving a user rating of at least one of said first object and said second object; and determining the plurality of items for recommendation based on said metadata and said rating.

21. The method as described in claim 6, wherein automatically displaying the respective images for the plurality of items includes populating a recommendation area of the graphical user interface with the respective images for the plurality of items.

22. The method as described in claim 6, wherein the plurality of items are based at least on one of a place, a person, an idea, a theme, and a genre in said first content of said first object and said second content of said second object.

* * * * *

UNITED STATES PATENT AND TRADEMARK OFFICE
CERTIFICATE OF CORRECTION

PATENT NO. : 9,704,189 B2  
APPLICATION NO. : 13/931563  
DATED : July 11, 2017  
INVENTOR(S) : James Wu et al.

Page 1 of 1

It is certified that error appears in the above-identified patent and that said Letters Patent is hereby corrected as shown below:

In the Claims

Column 22, Line 12, change "in claim 6" to --in claim 1--; and

Column 22, Line 17, change "in claim 6" to --in claim 1--.

Signed and Sealed this  
Seventh Day of May, 2019

Andrei Iancu  
*Director of the United States Patent and Trademark Office*